May 1, 1951 A. G. SMITH 2,551,470
APPARATUS FOR CONTROLLING THE POSITION OF A SHOCK WAVE
Filed Jan. 29, 1946 2 Sheets-Sheet 1

Inventor
AUSTIN GEOFFREY SMITH,
Attorney
By Robert B Pearson

May 1, 1951       A. G. SMITH       2,551,470
APPARATUS FOR CONTROLLING THE POSITION OF A SHOCK WAVE
Filed Jan. 29, 1946       2 Sheets-Sheet 2

Inventor
AUSTIN GEOFFREY SMITH,

By Robert B. [signature]
Attorney ed May 1, 1951

UNITED STATES PATENT OFFICE 2,551,470

APPARATUS FOR CONTROLLING THE POSITION OF A SHOCK WAVE

Austin Geoffrey Smith, Blaby, England, assignor to Power Jets (Research & Development) Limited, London, England Application January 29, 1946, Serial No. 644,123
In Great Britain February 1, 1945

5 Claims. (Cl. 73—147)

This invention relates to indicators or condition-responsive devices for use in gaseous fluid flow systems which at design point operate in supersonic velocity conditions, by which is meant in this specification and the appended claims, systems in which, at either side of the junction of contiguous zones of the flow, velocity conditions obtain which result in the formation, at the junction of the zones, of a "shock wave" represented by a large and more or less instantaneous change of pressure; that is to say, the flow velocities at either side of the junction are instantaneously changed in such a fashion that the velocity components normal to the shock, determined under the local conditions, are respectively supersonic and subsonic. In other words, the component Mach numbers at the points in question are respectively greater and less than unity, the Mach number being the ratio of the velocity of the fluid to the velocity of sound at the same point relative to the fluid.

The invention has application both to the case in which the relative velocity is derived from actual flow of the gaseous fluid, and that in which the relative velocity arises from movement of an entry in the fluid; and also both to the case in which the approach relative velocity as well as the velocity or component velocity at the zone of shock is supersonic, and that in which the approach relative velocity is subsonic whilst the velocity or component velocity at the zone of shock is supersonic, it being the velocity at this zone that is the material factor from the point of view of the invention. The invention further has application to the case in which the diffusion takes place from one supersonic velocity to a lower supersonic velocity, provided that shock waves occur. The zone of shock is not necessarily at the initial entry of a duct, but may be at the entry from a zone of supersonic velocity or component velocity to a zone of subsonic velocity or component velocity in a continuation of the same system.

The invention is based on the realisation firstly that the proper location of the shock wave is an important factor in the efficient operation of flow systems of the kind referred to, and secondly that by obtaining an indication of any movement of such location appropriate measures may be taken to restore it. The invention accordingly proposes the provision in a flow system of the kind referred to, of indicating or control means responsive to the conditions set up by said shock wave, said means comprising a plurality of heads arranged as if to be sensitive to local static pressure and spaced apart in the direction of flow to include between heads a zone at which the shock wave forms.

Since adjacent heads are located respectively up and down stream of a region at which the shock wave forms, then so long as the shock wave lies between them there will be an appreciable difference of pressure between them. If however the shock wave moves downstream of both there will be no difference or a reduced difference in the pressures and the pressures will be of a lower order, whilst if the shock wave moves upstream there will again be little or no difference of pressure, but in this case the pressures will be of a higher order.

By reason of these characteristics it becomes possible to achieve a variety of results; for example, to ascertain the location of a shock wave with reference to a duct entry or with reference to some particular region or part in a duct, or on a body exposed to the stream. By providing in association with the indicating means, a control capable of varying the location of the shock wave the latter may be maintained at an optimum position; thus mechanism may be provided for varying the area of a duct entry or the mass flow in relation to a given entry in such a way as to keep the shock wave tending to form at the entry in a certain location, and the shock wave responsive means referred to may be employed to effect automatic control of such mechanism.

In order that the invention may be clearly understood and readily carried into effect, reference will now be made to the examples of construction illustrated in the accompanying drawings, in which.

Figure 1:
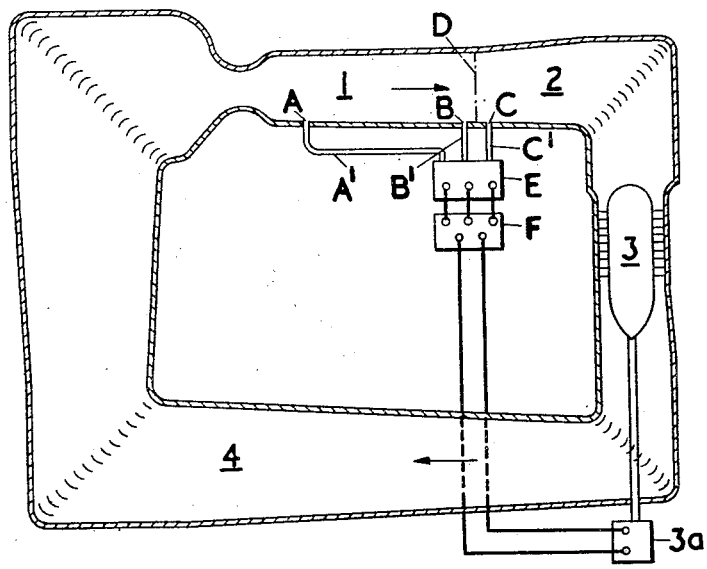
Figure 1 illustrates the application of static pressure heads in accordance with the invention to a wind tunnel for supersonic velocities.

Referring to Figure 1 of the drawings, the wind tunnel comprises a supersonic working section 1, a subsonic diffuser section 2, an energising compressor 3, and a subsonic return flow circuit 4.

Figure 3:
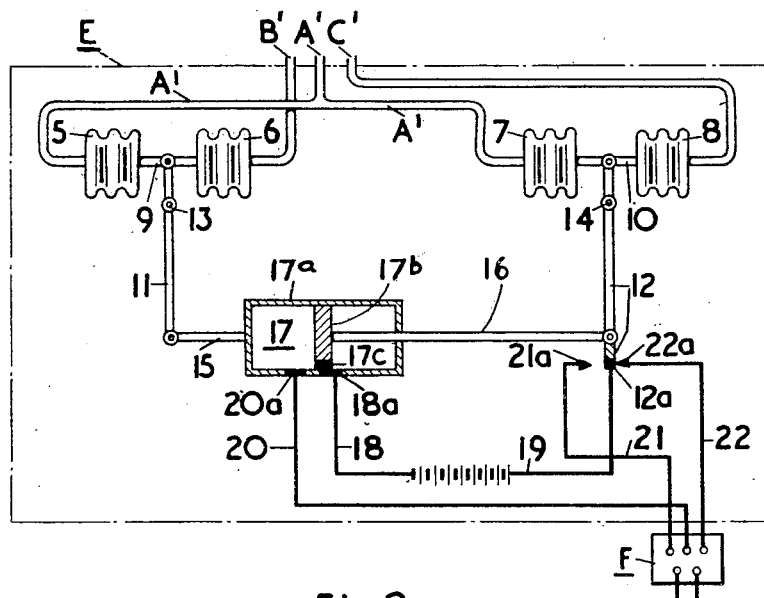
Figure 3 is a diagrammatic illustration of a control system for automatically controlling the area of an entry such as that shown in Figure 2, or the speed of rotation of a compressor such as that appearing in Figure 1, in order to maintain the shock wave at a desired position.

In the supersonic section 1, in accordance with the invention, are provided static pressure orifices at A, B, and C, of which B and C are arranged to include between them the zone at which, under a design condition of operation, the shock wave (indicated at D) at the junction of the zones of supersonic and subsonic operation should form, whilst A is well upstream of said junction. Thus, at design point, A and B will be in zones of supersonic velocity and low pressure, whilst C will be in a zone of subsonic velocity and higher pressure. The orifices A, B, C, may either be connected to pressure indicating devices and the compressor speed varied manually in accordance with the indications given in order to maintain the shock wave at the desired position or, and preferably, the static pressure heads may be used to operate an automatic control E such as that illustrated in detail in Figure 3. In the arrangement there illustrated, pairs of pressure-sensitive capsules 5, 6; 7, 8 are connected internally as indicated by pipe connections A1, B1, C1 to the heads A, B; A, C; respectively, the capsules of the pairs 5, 6 and 7, 8 being interconnected by rigid elements 9, 10 which in turn are connected to arms 11, 12 pivoted at 13, 14, and having their lower ends connected by links 15, 16 to an electric switch 17.

The switch 17 comprises relatively slidable parts 17a, 17b, of which the part 17b carries an insulated contact brush 17c adapted, according to the relative position of the parts 17a, 17b, to close simultaneously or to open, a pair of insulated contacts 18a, 20a, in the part 17a. The contact 18a is connected to one end 18 of a supply circuit, the other end 19 of which has a permanent connection with an insulated contact 12a on the arm 12; the contact 20a is connected by a lead 20 to an electrical control device F which also has leads 21, 22, terminating at contacts 21a, 22a, adapted to be engaged alternatively by the contact 12a according to the position of the arm 12. The nature of the device F may be entirely conventional and is immaterial to the present invention provided that it is capable of producing an adjusting effect in either of two senses according to whether the circuit 20, 21, or 20, 22 is made; for example, if the compressor 3 is driven by a variable speed electric motor 3a, the device F could be a reversible motor element which is driven in one sense or another according as the circuits 20, 21, or 20, 22 are made, and thereupon effects adjustment of, say, a variable resistance in the circuit of the motor 3 to vary the speed of the latter. The arrangement is such that when the pressure rises in the capsules 6, 8, connected to B and C, the lower ends of the levers 11, 12 are displaced to the right. In the position illustrated it is assumed that the shock wave is properly positioned between B and C and that in these circumstances the contact 22a is making the connection 19, 22, through the arm 12 and contact 22a, but not the connection 18, 20, A and B being at the same pressure and C at a higher pressure. Under these conditions the speed control is not varied. Should the shock wave now move upstream of B, then both B and C will be at the same pressure, higher than the pressure at A, and capsule 6 will expand to move the lever 11 and its associated switch part 17a to the right, the switch part 17b being held stationary by the capsules 7, 8. The switch is arranged so that it now makes the connections 18, 20 through the brush 17c. The connection 19, 22 being already made, the lines 20, 22, will now be in parallel circuit with the supply lines 18, 19, and the control F will now operate, the sense of operation being arranged to be that which will increase the compressor speed to bring the shock back to between B and C, whereupon the pressure in the capsule 6 will again fall and cause return of the switch part 17a to the open position. Should the shock wave move downstream of C, all the points A, B, C will be at the same pressure and capsule 8 will have contracted relatively to its original dimension, thus moving lever 12 to the left to engage contact 21a and also moving switch part 17b to close contacts 20a, 18a, this position resulting in the connections 18, 19; 20, 21, being made, so that the control circuit now operates in the opposite sense to restore the shock wave to its proper location.

The function of the third head A and the corresponding capsules 5, 7, is to ensure that the datum atmospheric pressure with respect to which the capsules 6, 8, operate is that at the intake, and not that of the atmosphere in which the capsules are placed, which may be quite different and may be variable.

Figure 2:
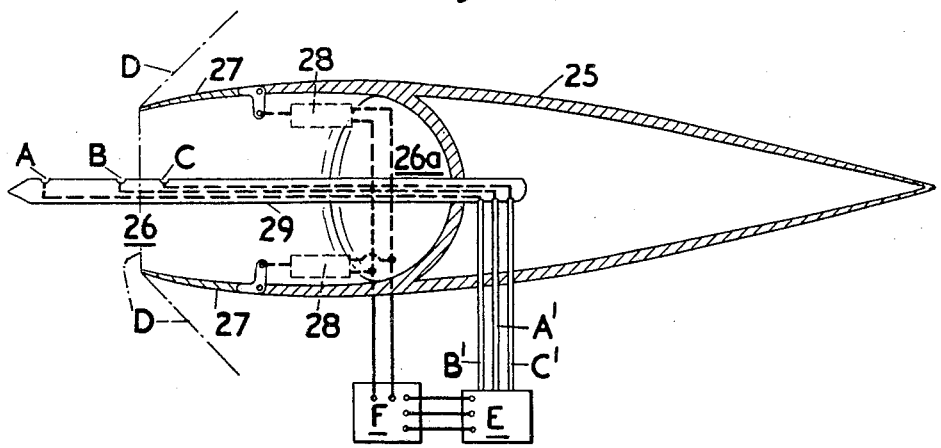
Figure 2 is a diagrammatic sectional elevation of an aircraft wing having static pressure heads in accordance with the invention arranged to detect the location of a shock wave in an entry of variable area designed to operate under supersonic conditions.

In the application of the invention illustrated in Figure 2, 25 is an aircraft wing having at its leading edge an air entry 26 defined by upper and lower hinged flaps 27 movable between fixed side walls and controllable by electric jacks 28 to permit variation of the entry area, it being assumed that the entry is connected by suitable ducting 26a along the wing, say to a power unit in the aircraft's fuselage, and is required to operate in supersonic conditions as hereinbefore defined. Lying on the flow axis of the entry 26 is a casing 29 in which are formed static pressure head orifices A, B, C, of which B and C are arranged to include between them the zone (i. e. the plane of the entry) at which, under conditions of supersonic approach velocity, a normal shock wave should form, whilst A is well upstream of the entry. As in the example illustrated in Figure 1, the orifices A, B, C, may either be connected to pressure indicating devices and the entry area varied by manual control of the jacks 28, in accordance with the indications given, in order to maintain the shock wave at the desired position or and preferably, the pressure heads may be used to operate the automatic control E, F, illustrated in Figure 3. In the latter event the automatic control operates in the same manner as has already been described, with the exception that its effect is to control the jacks 28 instead of the motor of compressor 3 previously considered, the arrangement being such as to reduce the inlet area when the shock wave advances to between A and B, and to increase said area when the shock wave retires downstream of C.

Whilst the pressure heads have been stated to be in the nature of static heads some cases may require that the pressure differential between heads causes a flow of fluid which is so to speak tapped from the main stream, and this flow may be used for operating purposes or measured, to accord some desired correspondence with the existence and location of the shock-wave.

I claim:

1. In a gaseous fluid flow system in which, when operating under design conditions, velocity conditions obtain at either side of contiguous zones of the flow which result in the formation at the junction of said zones of a shock wave, the combination of means for controllably varying the conditions of operation and thereby the position of the shock wave, detector means for determining the position of said shock wave, said detector means comprising three pressure heads sensitive to local static pressure in the flow and positioned in spaced relationship therein so that the two more downstream heads include between them the zone at which the shock wave forms in design conditions of operation whilst the third head is upstream thereof, pressure responsive capsules connected to each of said two downstream heads, means transmitting from said capsules a control bias to the means for modifying the operating conditions of the system, and a pair of capsules connected to said third head and rigidly associated one with each of said first two capsules to act as a datum atmosphere in relation thereto.

2. In a gaseous fluid flow system in which, when operating under design conditions, velocity conditions obtain at either side of contiguous zones of the flow which result in the formation at the junction of said zones of a shock wave, an arrangement for automatically controlling the position of the shock wave in the system, comprising pressure sensing stations exposed to the static pressure in the system at at least three stations therein spaced apart in the direction of flow, two of said stations being positioned to include between them the zone at which the shock wave forms in the design conditions of operation so that widely different pressure conditions prevail at said stations so long as the shock wave remains between them, while the third station is spaced in the same direction from both said two stations and comprises a datum station, pressure responsive means responsive to changes in the relative pressures at each of said two stations as modified by reference to a datum pressure afforded by the pressure at said third station, means for controllably varying the conditions of operation and thereby the position of the shock wave, and means responsive to said relative pressure responsive means for automatically controlling the means for varying the conditions of operation to maintain the shock wave in its design position of operation by restoring the shock wave to its design position of operation on its departing therefrom.

3. An arrangement as set forth in claim 2, wherein said third station comprises a datum pressure sensing station upstream of said two stations, said automatic control means including pressure responsive elements responsive respectively to the pressures at each of the two downstream stations to effect adjustment of the shock wave, and means responsive to the pressure at said third station and coupled to said pressure responsive elements to form a datum therefor.

4. In a gaseous fluid flow system operable at supersonic velocities, means for producing a shock wave at a predetermined locality therein by the formation of contiguous zones of the flow in which different velocity conditions prevail, means for controllably varying the shock wave producing means and thereby the position of said shock wave, and means responsive to the pressures in said zones for operating said controlling means to return the shock wave to said predetermined locality upon changes in its position therefrom.

5. In a gaseous fluid flow system having an entry of variable area, means producing a flow in said system such as to result in the formation of a shock wave in the general region of said entry, means for controllably varying the area of said entry, and means responsive to the static pressure in the flow at two closely adjacent stations located respectively immediately before and after said entry for operating said entry area control means, said pressure responsive means acting in the sense that the entry area is reduced or increased according as the shock wave occurs respectively upstream or downstream of the said two stations.

AUSTIN GEOFFREY SMITH.

REFERENCES CITED

The following references are of record in the file of this patent:

UNITED STATES PATENTS

| Number | Name | Date |
|---|---|---|
| 1,879,575 | Standerwick | Sept. 27, 1932 |
| 2,212,186 | Ricardo | Aug. 20, 1940 |
| 2,396,598 | Newmann et al. | Mar. 12, 1946 |
| 2,409,433 | Hunter | Oct. 15, 1946 |

FOREIGN PATENTS

| Number | Country | Date |
|---|---|---|
| 608,583 | Germany | Jan. 26, 1935 |